United States Patent [19]
Verdier

[11] 3,897,813
[45] Aug. 5, 1975

[54] RECAPPED RADIAL CARCASS TIRE

[75] Inventor: Henri Verdier, Beauregard-L'Eveque, France

[73] Assignee: Compagnie Generale des Etablissements Michelin, raison sociale Michelin & CIE, France

[22] Filed: Apr. 3, 1973

[21] Appl. No.: 347,400

[30] Foreign Application Priority Data
Apr. 6, 1972 France .................. 72.012203

[52] U.S. Cl. .................. 152/209 R; 152/330 R
[51] Int. Cl.² .................. B60C 11/06
[58] Field of Search .......... 152/209 R, 330; 156/96, 156/128 R, 129

[56] References Cited
UNITED STATES PATENTS

| | | |
|---|---|---|
| 2,090,256 | 8/1937 | Heintz ........................... 152/209 R |
| 2,100,478 | 11/1937 | Grange ........................... 152/209 R |
| 2,177,165 | 10/1939 | Beckman ........................... 156/96 |
| 2,228,211 | 1/1941 | Heintz ........................... 152/209 R |
| 2,542,871 | 2/1951 | Johnson ........................... 152/209 R |
| 2,675,855 | 4/1954 | Heintz ........................... 156/96 |
| 2,697,472 | 12/1954 | Hawkinson ........................... 156/96 |
| 3,464,873 | 9/1969 | Hawkinson ........................... 156/96 |

*Primary Examiner*—Drayton E. Hoffman
*Attorney, Agent, or Firm*—Brumbaugh, Graves, Donohue & Raymond

[57] ABSTRACT

Recapped radial carcass tires for heavy road vehicles having greater radial flexibility are achieved by means of a recap tread having a smaller tread width and/or having modified widths and/or modified distances from the central plane of the tire of the circumferential zigzag grooves or cuts as compared with the corresponding components of the original tread.

10 Claims, 3 Drawing Figures

PATENTED AUG 5 1975   3,897,813

RECAPPED RADIAL CARCASS TIRE

The present invention relates to improvements in the recapping of radial carcass tires for heavy road vehicles such as buses, trucks, etc. More particularly, it concerns a design of tread which is especially adapted for the recapping of these tires.

As is known, radial tires are remarkable for their long life. However, although the tread normally is worn out only at the end of a very long mileage, the reinforcement, particularly when of metal, has a far greater life. This is particularly true in the case of tires for heavy vehicles whose carcass is designed to withstand a very high inflation pressure and load and to travel at moderate speed. In this case, the carcass of a tire whose tread is worn can be reused with full safety by providing it with a new tread, provided, however, that recapped tires are not used on the wheels which steer the vehicle.

However, while the carcass of a radial tire for heavy vehicles can be recapped after the original tread has become worn, it should not be forgotten that it has already been used and that it may therefore have regions which are more fatigued and the location of which is due in particular to the design and profile of the original tread. It is thus a mistake to recap a carcass with the use of a tread which has a design identical to that of the original tread. On the contrary, it is preferable to select a design which will change the location of the maximum stresses in the carcass and which will therefore further improve the life of the recapped tire.

The present invention is directed to precisely at adapting the design of the recap tread with due consideration of the design of the original tread so that the regions of the carcass which have been subjected to the greatest fatigue stresses during the first life of the tire are alleviated during its second life. Of course, this adaptation must not result in a general overload or in a worsening of the road qualities of the tire. The present invention, in order to achieve this adaptation, takes advantage of a favorable circumstance, namely that although the design of a tire tread for heavy vehicles meets multiple, complex demands, it is relatively simple and is composed essentially of circumferential zigzag grooves and ribs.

The recapped radial carcass tire for heavy road vehicles which forms the object of the invention and the tread of which is cut in circumferential zigzag ribs by means of circumferential zigzag grooves or cuts is characterized by the fact that the recap tread is made more flexible in the radial direction, as compared with the original tread, by modification of at least one of the following parameters:

a. width of the tread,
b. width of the circumferential grooves,
c. distance between the circumferential grooves and the median plane of the tire cover.

In accordance with preferred arrangements:

a. the reduction in the width of the tread is accompanied by a reduction in the thickness of the rubber in the shoulders, that is to say, at the junction of the tread and the sidewalls;

b. the modification in the widths of the grooves or cuts consists in widening the circumferential zigzag grooves or cuts, and particularly those which are furthest away from the central plane; the widening of the grooves or cuts which are furthest away from the central plane may be accompanied by a narrowing of the grooves or cuts which are closest to the central plane so as not excessively to modify the amount of cutting;

c. the modification of the distances from the central plane consists in moving the most distant grooves or cuts further away from said plane and, on the other hand, moving the closest grooves or cuts closer to it.

These measures have the effect of bringing the zones of the carcass which are located in the sidewalls where the maximum flexing of the carcass takes place closer to the surface of travel of the tire. When one observes a radial carcass tire, it is noted that the sidewalls, in the vicinity of the area of contact with the ground, show a characteristic bulging. In this zone, the cords of the carcass experience substantial flexing upon each rotation of the wheel. It can easily be seen that by displacing the point where the maximum flexing takes place under the same conditions of load and pressure, the zone where the carcass is subjected to the most fatigue is shifted.

One could have thought of shifting the zones of maximum fatigue of the carcass by moving them away from the surface of travel, by modifying the rigidity in the radial direction of the crown of the tire. This solution, in addition to being of a higher cost, has the principal drawback of increasing the working temperature of the tire and of thus making the tire work under conditions which are less favorable than those for which it was designed.

All measures which modify the rigidity of the tread in radial direction, and this preferably in the sense of making it more flexible, contribute towards usefully shifting the region of maximum fatigue and flexure of the carcass. Among the measures which produce a substantial effect, mention may be made, in accordance with the invention, of the narrowing of the tread, the reducing in size of the shoulders, the widening of the cuts, particularly those remote from the central plane, and the transverse displacement thereof. One can, of course, use all these measures in combination. However, it is generally preferable to combine with certain measures which have a favorable effect other measures which have a contrary effect, provided, of course, that the resultant effect is favorable. Thus, for instance, it is preferable not to widen all the grooves, which would reduce the resistance to wear of the tread, but to widen the grooves which are furthest away from the central plane, while narrowing the closest grooves, provided that the widening of the former more than compensates for the effect of the narrowing of the latter. Similarly, one can without any great disadvantage eliminate a central cut if one brings the grooves closest to the central plane closer to said plane.

The present invention will be illustrated by an embodiment which will be described with reference to the accompanying drawings in which.

Figure 1:
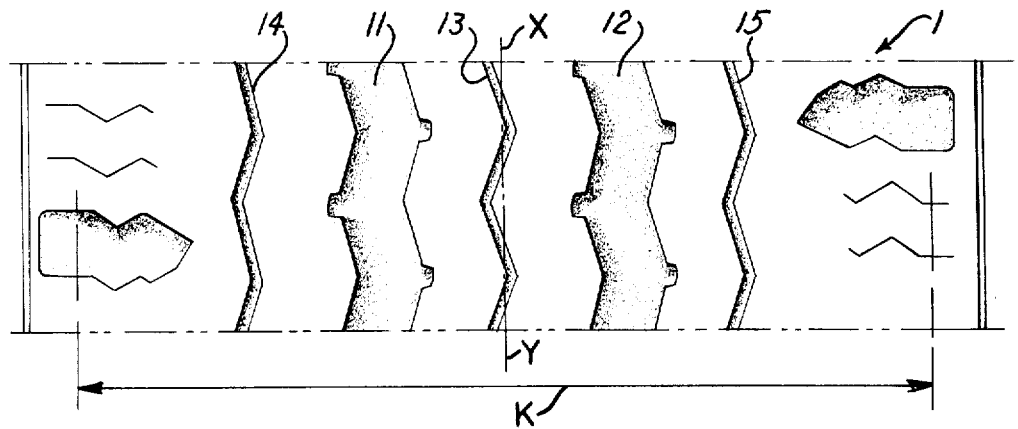
FIG. 1 is a plan view of a portion of a tread of a new tire, of known type.

FIG. 1 shows a tread 1 for a new tire having a design in accordance with that described in French Pat. No. 1,452,048. It comprises essentially two wide grooves 11 and 12 which are substantially closer to the central plane XY of the tire than to the shoulders; a very thin central cut 13; two lateral cuts 14 and 15 which are slightly wider than the central cut 13. The grooves 11 and 12 and the cuts 13, 14, 15 have a zigzag course and pass over the tread in the direction of travel.

By way of example, in the case of a radial tire of size 12.00 - 20, the tread 1 has a width K of 236 mm., the grooves 11 and 12 have a cross-section of a width of 17 mm., the central cut 13 and the lateral cuts 14 and 15 have a width of 1.5 mm. and 2.5 mm., respectively. The grooves 11 and 12 are at an average distance of 34.5 mm. from the central plane XY, and the cuts 14 and 15 at an average distance therefrom of 69 mm.

Figure 2:
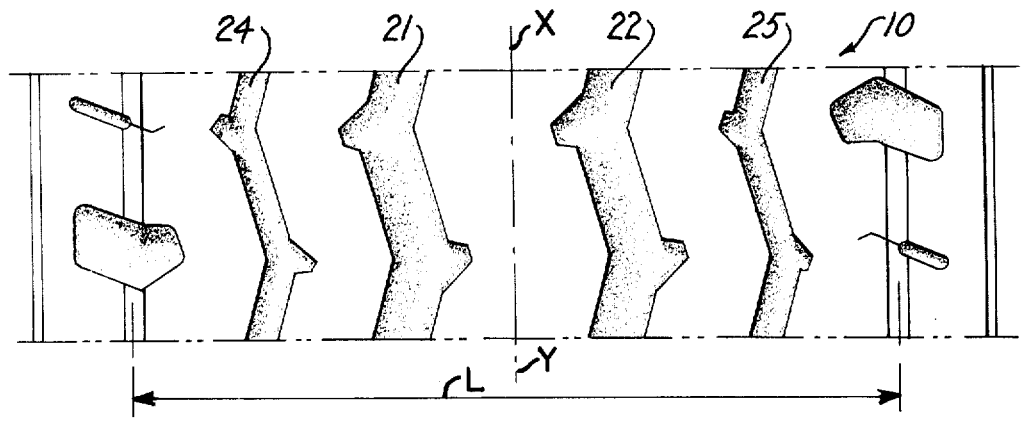
FIG. 2 is a plan view of a portion of a recap tread in accordance with the invention which is suitable for replacing the tread of FIG. 1.

FIG. 2 shows a recap tread 10 suitable for replacing the tread 1 of FIG. 1. It also has two wide grooves 21 and 22 corresponding to the wide grooves 11 and 12 but arranged at a smaller distance from the central plane XY. The tread 10 does not have a central cut and the lateral cuts 14 and 15 are replaced by lateral grooves 24 and 25 which are wider than the lateral cuts 14 and 15, while remaining definitely narrower than the grooves 11 and 12 or 21 and 22. It can furthermore be noted that the width L of the tread 10 is less than the width K of the tread 1, and that the shoulders are therefore reduced in size.

To give an idea, in the case of a recapped radial carcass tire of size 12.00 - 20, the tread 10 has a width L of 215 mm., the grooves 21 and 22 have a width of 15 mm. and are at a distance of 31 mm. from the central plane XY, and the grooves 24 and 25 have a width of 7.5 mm. and are at a distance of 70 mm. from the central plane XY.

Figure 3:
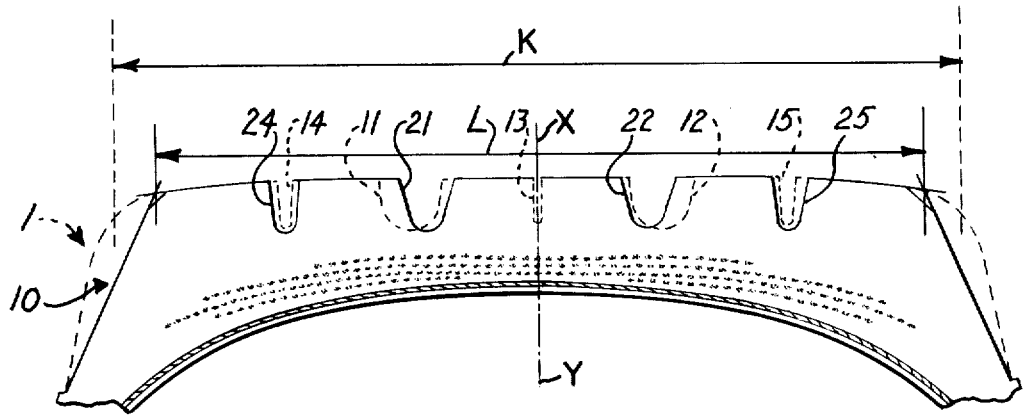
FIG. 3 shows, in radial or transverse section and in continuous lines, the recap tread of FIG. 2 with, in dashed line, the new tire tread of FIG. 1 superimposed on it.

FIG. 3 shows, superimposed, a radial or transverse section through the tread 10 and the tread 1 and makes it possible easily to compare the differences in size and position between corresponding elements and to understand that the recap tread 10 has more flexibility in radial direction than the original tread 1.

A comparison between the recap tread 10 and the original tread 1 shows the following differences:
reduction of about 10 percent in tread width,
reduction in size of the shoulders,
lateral grooves (24 and 25) slightly further from the central plane but much wider,
central gooves (21 and 22) slightly narrower and closer to the central plane,
elimination of the central cut (13).

As a whole, these differences, without resulting in substantial changes in the road qualities, result in a definitely greater radial flexibility, and therefore in the displacement of the zones of maximum flexure of the sidewalls, in addition to which they facilitate the recapping and make it more economical to perform.

What is claimed is:

1. A recapped radial carcass tire for heavy road vehicles having a recap tread whose pattern includes a plurality of circumferential zigzag grooves of different widths located at different distances from the central plane of the recapped tire, said recap tread being a retread of an original radial carcass tire which had a tread whose pattern included a plurality of circumferential zigzag grooves of different widths located at different distances from the central plane of the original tire, the circumferential grooves of the recap tread which are furthest away from the central plane of the recapped tire being wider than the corresponding circumferential grooves of the original tire tread, whereby the zone of maximum flexure in the sidewalls of said recapped tire is nearer to said recap tread than was the corresponding zone of said original tire.

2. The recapped radial carcass tire as defined by claim 1 wherein also the width of the recap tread is less than the width of the tread of the original tire.

3. The recapped radial carcass tire as defined by claim 1 wherein also the circumferential grooves of the recap tread which are closest to the central plane of the recapped tire are narrower than the corresponding circumferential grooves of the original tire tread.

4. The recapped radial carcass tire as defined by claim 3 wherein also the width of the recap tread is less than the width of the tread of the original tire.

5. A recapped radial carcass tire for heavy road vehicles having a recap tread whose pattern includes a plurality of circumferential zigzag grooves of different widths located at different distances from the central plane of the recapped tire, said recap tread being a retread of an original radial carcass tire which had a tread whose pattern included a plurality of circumferential zigzag grooves of different widths located at different distances from the central plane of the original tire, the circumferential grooves of the recap tread which are furthest away from the central plane of the recapped tire being further away from said plane than were the corresponding circumferential grooves of the original tire tread, whereby the zone of maximum flexure in the sidewalls of said recapped tire is nearer to said recap tread than was the corresponding zone of said original tire.

6. The recapped radial carcass tire as defined by claim 5 wherein also the width of the recap tread is less than the width of the tread of the original tire.

7. The recapped radial carcass tire as defined by claim 5 wherein also the circumferential grooves of the recap tread which are closest to the central plane of the recapped tire are nearer to said plane than were the corresponding circumferential grooves of the original tire tread.

8. The recapped radial carcass tire as defined by claim 7 wherein also the width of the recap tread is less than the width of the tread of the original tire.

9. A recapped radial carcass tire for heavy road vehicles having a recap tread whose pattern includes a plurality of circumferential zigzag grooves of different widths located at different distances from the central plane of the recapped tire, said recap tread being a retread of an original radial carcass tire which had a tread whose pattern included a plurality of circumferential zigzag grooves of different widths located at different distances from the central plane of the original tire, the circumferential grooves of the recap tread which are furthest away from the central plane of the recapped tire being wider than and further away from said plane than were the corresponding circumferential grooves of the original tire tread and the circumferential grooves of the recap tread which are closest to the central plane of the recapped tire being narrower than and nearer to said plane than were the corresponding circumferential grooves of the original tire tread, whereby the zone of maximum flexure in the sidewalls of said recapped tire is nearer to said recap tread than was the corresponding zone of said original tire.

10. The recapped radial carcass tire as defined by claim 9 wherein also the width of the recap tread is less than the width of the tread of the original tire.

* * * * *